E. K. BAKER.
DEMOUNTABLE RIM FOR AUTOMOBILE WHEELS.
APPLICATION FILED MAR. 10, 1914.

1,101,386.

Patented June 23, 1914.

3 SHEETS—SHEET 1.

Witnesses

Inventor
Erle K. Baker

Attorney

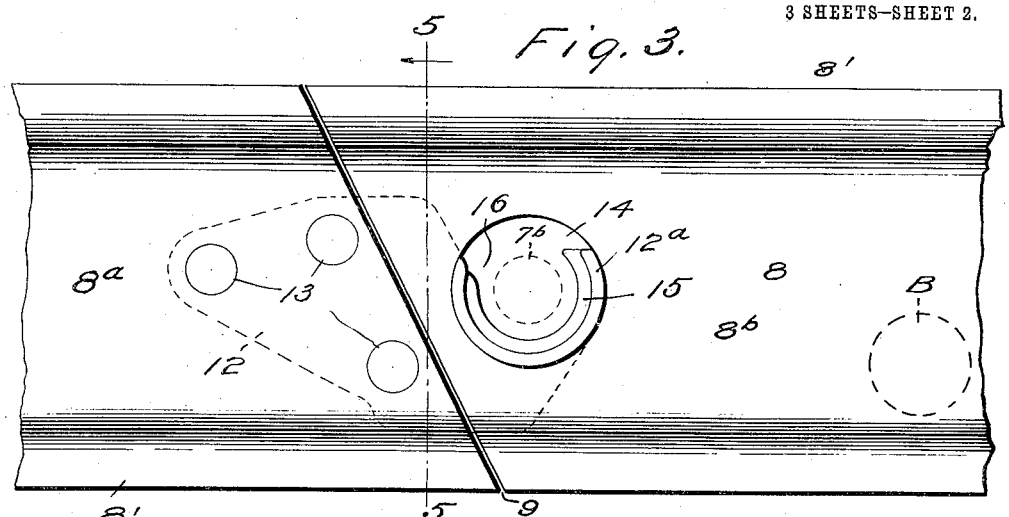
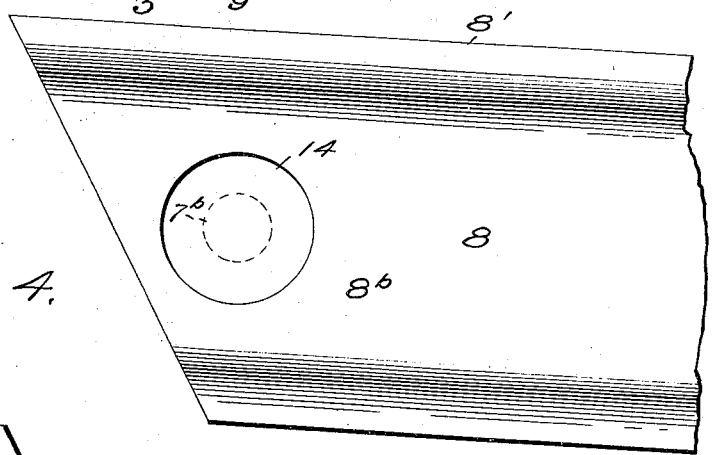
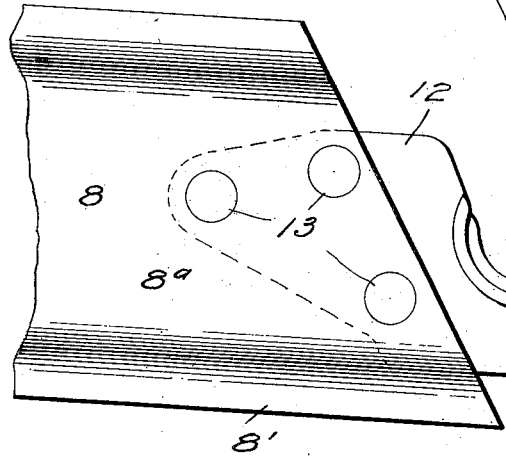
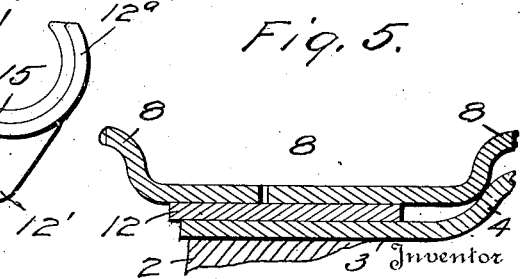

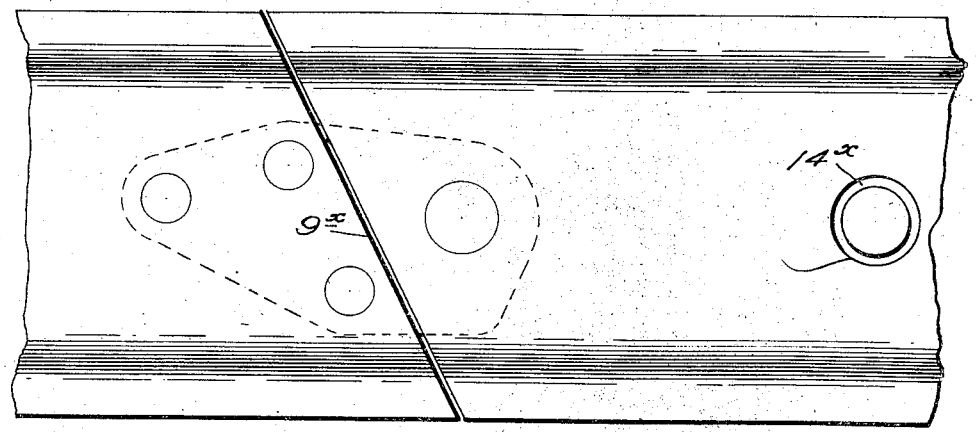
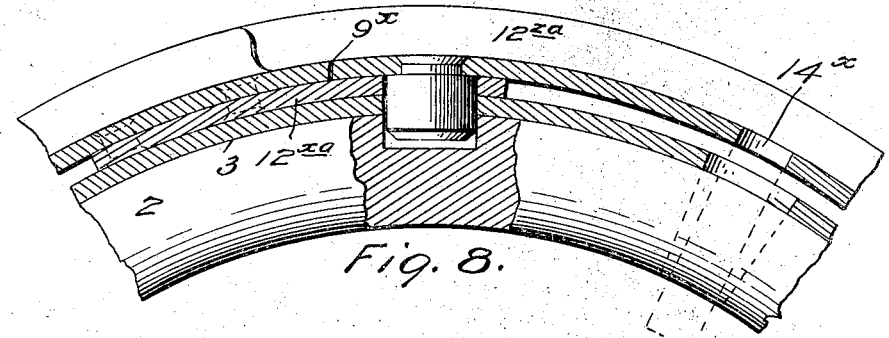
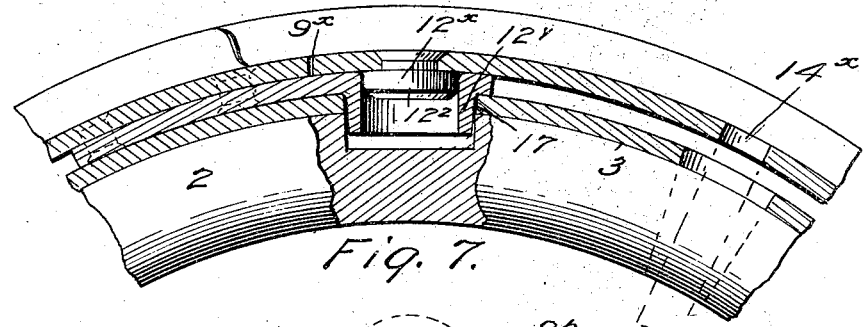
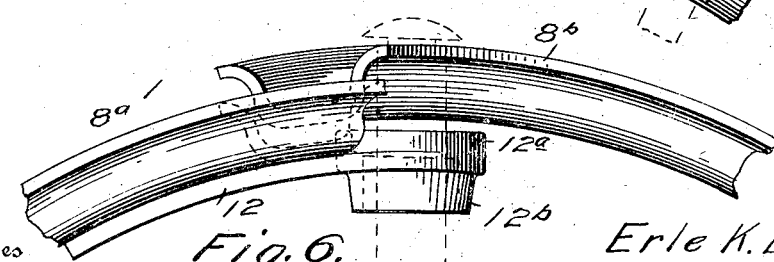

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM FOR AUTOMOBILE-WHEELS.

1,101,386. Specification of Letters Patent. Patented June 23, 1914.

Application filed March 10, 1914. Serial No. 823,804.

*To all whom it may concern:*

Be it known that I, ERLE K. BAKER, a citizen of the United States, and a resident of Chicago, county of Cook, and State of Illinois, have invented certain new and useful Improvements in Demountable Rims for Automobile-Wheels, of which the following is a specification.

My invention relates to demountable tire-carrying rim constructions for automobile wheels and has special reference to improvements in and upon demountable rims of the transversely split and bolted-on type.

An object of my invention is to provide a demountable rim of more simple construction and of lower cost than any now in use; which more easily may be placed in and taken from a pneumatic tire; and which may be used interchangeably upon most automobile wheels now in use.

A further object of my invention is to dispense with the many parts which are now used to connect the ends of such a rim and in place thereof substitute a single member which preferably shall serve all the purposes of a spacer, a connector, an aliner, a driver, a supporting stud and a valve stem container, whereby the construction of the rim may be greatly simplified while maintaining at maximum the necessary qualities of strength, rigidity, durability, safety, efficiency and ease of operation.

My invention resides in the novel construction and combinations of parts hereinafter described and more particularly pointed out in the appended claims and will be more readily understood by reference to the accompanying drawings forming a part of the specification, and in which—

Figure 1:
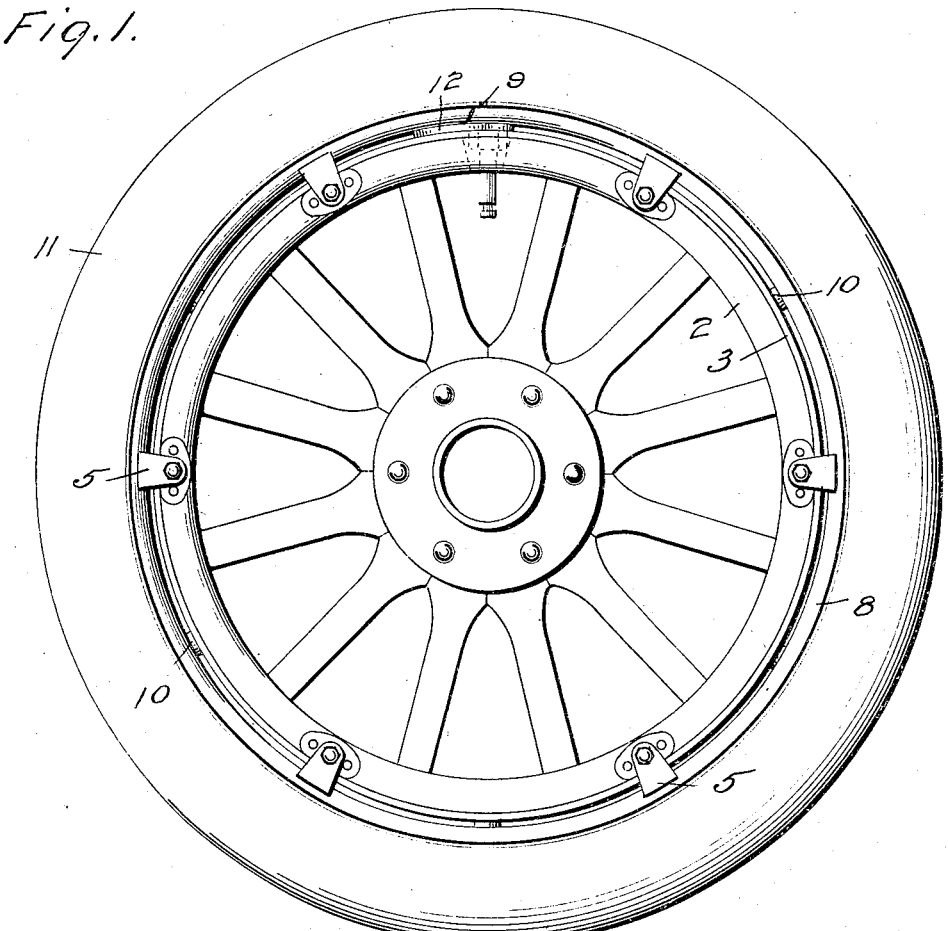
Figure 2:
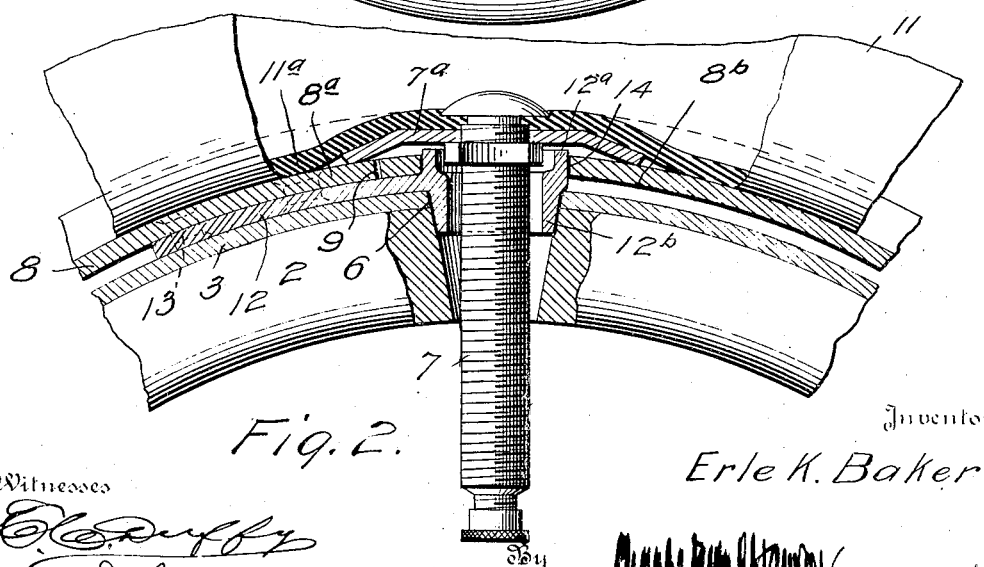

Figure 1 is a side view of an automobile wheel equipped with a pneumatic tire mounted upon a demountable rim embodying my invention; Fig. 2 is an enlarged vertical and longitudinal section of the wheel, rim and tire, adjacent the valve stem; Fig. 3 is a similarly enlarged view of the outer periphery of the rim, showing the transverse split therein and the rim and connecting means; Fig. 4 shows the rim ends as they appear after they are unlocked and separated; Fig. 5 is a transverse section on the line 5—5 of Fig. 3; Fig. 6 is a side view of the separated rim ends; Fig. 7 illustrates a modification of my invention in which the valve stem is remote from the split in the rim and not accommodated within the connecting member; Fig. 8 shows a further modification, also in which the valve stem is remote from the split; and, Fig. 9 is a plan view of the parts shown in Fig. 8.

In these drawings I have shown a typical automobile wheel having a wooden felly 2 and a metal felly band 3. The latter, as shown in Fig. 5, may be provided with the usual inner-side flange 4, against which the rim is thrust by bolt-actuated wedge-lugs 5, of usual construction.

The invention is not limited to a felly band flanged on the inner side of the felly and wedge-lugs upon the outer side of the wheel, for in lieu of the flange on the felly band I may, and at times do, employ an inner-side set of wedge-lugs, after the manner shown in application Serial No. 685,103, filed May 20, 1912. Further, my invention is not limited to the combination of the metal felly band and wooden felly, for an all-metal construction of the same general form and purpose may be substituted; and where the words "felly band" appear hereinafter they are used in this inclusive sense.

The felly band, as well shown in Fig. 2, is provided with a large valve-stem-opening 6. The outer end of the hole is usually considerably larger than the valve stem 7, while the inner end nearly fits the stem; the hole being conical to make it easy to drop the valve stem through the wheel felly when placing the rim and tire on the wheel. Most automobile wheels of present day construction which carry rim securing wedge-lugs, have valve holes thus proportioned to the valve stem.

8 is the demountable rim. As here shown it has integral flanges 8', 8' shaped to receive a straight-side pneumatic tire. The rim 8 is split or cut apart at one point on a transverse line. Thus, 9 represents the split in the rim, and 8ª is one end of the rim, and 8ᵇ the other. I prefer a diagonal split, as shown in Figs. 3 and 4, the same being of the kind and for the purpose set forth in application Serial No. 502,069 filed June 14, 1909.

The outer side of the rim is supported by the wedge-lugs 5 and preferably by intermediately positioned supporting studs 10, though neither is requisite to the present invention. The dotted circle B in Fig. 3, indicates the position of the studs 10 with respect to the outer side of the rim, though not correctly representing the space between the split 9 and the nearest studs.

The tire 11 is seated on the rim 8 and it is customary to keep the tire inflated thereon whether or not the rim is in position on the wheel. The pressure of the inflated tire tends to collapse the rim. The pressure of the wedge-lugs tends to expand the rim. To overcome both tendencies I employ a single member at the split 9 in the rim; and this member as about to be described, preferably and conveniently serves many purposes.

Referring now to Figs. 1 to 5 it will be noted that a single member or plate 12 is secured to the inner periphery of the rim at the end 8ª by rivets 13, or by welding. The plate projects beyond the rim and therefore, laps beneath and upon the inner face of the end 8ᵇ of the rim. The plate is preferably curved, like the rim surface to which it applies, and, preferably, the plate 12 serves as the spacer between the rim ends and the face or felly band of the wheel; that is, the plate is of a thickness to fill the space between the rim and the felly band as shown in Figs. 1, 2 and 5. For ease of operation I prefer that the plate 12 shall be of less width than the body of the rim; but to provide the equivalent of a supporting stud at the outer side of the rim I preferably form the plate with an extension 12′; this preferably also bridges the split or gap, as shown in Fig. 3. In the rim end 8ᵇ and adjacent to the split 9 I provide a large hole 14 for the valve stem 7. I make the hole at this point in order that the spreader 7ª of the valve stem may close or bridge the split, and thus keep the inner casing or air tube 11ª out of the split. This hole 14 I utilize as part of the means for locking the rim ends together; that is, I provide the free end of the plate 12 with an upwardly or outwardly extending boss 12ª positioned to fit within the hole 14, when the rim ends are brought together as in Figs. 2 and 3. It will be understood that the rim ends, when free from the wheel, may be quite readily sprung apart in a radial direction and may be as easily separated in a transverse or lateral direction. These two conditions are respectively represented in Figs. 6 and 4. The lower or inner side of the plate 12 is provided with an integral boss 12ᵇ of a size to snugly fit the hole 6 in the felly band 3. When thus positioned the plate serves as the driver connection between the rim and the wheel, whereby the rim is secured for rotation with the wheel.

It will be noted that the free end of the plate 12 is formed after the manner of a hook; the same, and both its bosses 12ª and 12ᵇ, being cut away or opened toward the inner side of the rim; that is, in the direction of the split. The hooked end of the plate is indicated by the numeral 15, and the opening of the hook by the numeral 16. This formation of the end of the member leaves an opening or space for the valve stem within the member, when within the hole 14. The approximate position of the valve stem is represented by dots 7ᵇ in Figs. 3 and 4.

From the foregoing it will be clear that the member 12 with its boss 12ª, serves to positively join the rim ends against either expansion or contraction and also serves to positively aline the rim ends. I prefer that the relation shall be such that the connecting member serves to hold the rim ends slightly apart so that the latter are not forced together by the pressure of the tire on the rim.

In placing the described rim in a tire, the valve stem of the latter is first put through the hole 14 and the end 8ᵇ is placed on the beads of the tire. Starting at that point, the rim is progressively placed upon the beads of the tire, the end 8ª being the last to enter the tire. Obviously the angularity of the split makes it possible easily to enter the end 8ª. At that moment the free end of the connecting member slips beneath the end 8ᵇ and the boss 12ª snaps into the hole 14 therein. The open hook formation of the connecting member permits it to pass into this position without interfering with the valve stem in the hole 14. When the rim has been placed on the tire in this manner, the tire is then inflated, after which it may be placed on the wheel. At that time the driver boss 12ᵇ is placed in the hole 6 in the wheel felly and thereafter the rim is secured by means of the wedge-lugs 5, in the usual manner. When the rim is removed from the wheel and after the tire is deflated, the end 8ª of the rim easily may be forced inward to free the ends of the rim from one another and permit the rim to be removed from the tire, such action being the reverse of that above described.

Though it is desirable to close the split by means of the valve stem spreader, as above described, the valve stem hole is not always located at or adjacent to the split but is remote therefrom, and sometimes diametrically opposite the split. In that case it is unnecessary that the connecting member shall be either hollow or of hooked form to accommodate the valve stem. Such conditions are represented in Figs. 7, 8 and 9, in which the valve stem hole 14$^x$ is more or less remote from the split 9$^x$. In such case I provide the felly band with a second hole 17, either small or large according to the size of the driving part to be used therein, as indicated in Figs. 7 and 8. In Fig. 7 the connecting member 12$^x$ has an annular driving boss 12$^y$, and the connection is completed by a stud 12$^z$ on the co-acting end of the rim. As shown in Fig. 8 the stud 12$^{za}$ on the end of the rim may be lengthened, to itself serve as the driver, in which case the end of the member 12$^{xa}$ is provided with a mere hole to receive the stud 12$^{za}$.

As used in the appended claims the word " rim " means—a suitably flanged, tire-carrying, demountable wheel rim; and, the word " transplit " means — transversely split—containing a transverse split.

While I have illustrated and described my invention in accordance with the patent statutes, I desire it to be understood that the details of construction may be materially varied and that various changes, modifications and substitutions may be made in the demountable rim herein illustrated without departing from the spirit and scope of my invention as set forth in the appended claims.

Having thus described my invention I claim as new and desire to secure by Letters Patent:

1. A transplit rim containing a valve stem hole in one end, in combination with a rim-end connecting member fixed on the other end of the rim to snap into said hole when occupied by a valve stem.

2. A transplit rim containing a valve stem hole in one end, in combination with a rim-end connecting member fixed on the other end of the rim to snap into said hole and on its inner side provided with a driving projection.

3. A transplit rim containing a valve stem hole in one end adjacent to the split in the rim, in combination with a rim-end interlocking and valve stem protecting member fixed on the other end of the rim to enter the said hole.

4. A transplit rim containing a valve stem hole in one end adjacent to the split in the rim, in combination with a driver fixed on the other end of the rim and having a hooklike projection to snap into said hole around a valve stem therein.

5. A diagonally transplit rim containing a valve stem hole in one end adjacent to the split in the rim, in combination with a spacing and driving member fixed on the other end of the rim and having a hook-like end formed to snap into said hole when the rim ends are alined.

6. A diagonally transplit rim, in combination with a driving plate rigidly secured to the inner periphery thereof at one end of the rim, bridging the split and normally lapping upon and alining the other end of the rim.

7. A transplit rim having a driver and valve stem bushing rigidly secured to one of its ends and detachably interlocked with the other and serving to prevent accidental separation of the rim ends.

8. A transplit rim having a rigid member upon and projecting from one end, and formed with inner and outer projections to interlock with the other rim end and a wheel felly, respectively, when the rim ends are alined and permitting free helical separation of the rim ends when free from the wheel.

9. A diagonally transplit rim having a valve stem opening in one end, in combination with a member fixed on the other end of the rim and formed with a hook-like bushing providing projections to respectively enter said hole and the valve stem hole of a wheel felly.

10. A wheel felly band containing a hole, in combination with a transplit rim containing a valve stem hole in one end, a member fixed upon the other end of said rim and having a part to fit in the hole of the felly band and another part to fit in said valve stem hole.

11. A transplit rim containing a valve stem hole in one end adjacent to the split in the rim, in combination with a rim-end interlocking and valve stem protecting member fixed on the other end of the rim to enter the said hole, and on its inner side provided with a driving projection.

12. A transplit rim having a valve stem hole in one end, in combination with a member fixed on the other end of the rim and lapping beneath the end containing said hole, said member having an outer side supporting extension which bridges the split in the rim.

13. A diagonally transplit rim having an enlarged valve stem hole in one end adjacent to the split, in combination with a plate-like member fixed to the other end of the rim upon the inner periphery thereof, and having a free end which laps beneath the end containing the hole, said free end having an integral projection upon its outer side which fits said hole and on its inner side provided with a driving projection, and said free end with its projections containing a notch to admit the valve stem.

14. A transplit rim having a valve stem hole in one end near the split, in combination with a rim end connecting member rigidly fixed on the other end of the rim and lapping beneath the end containing said hole, said member having a hook-like valve stem bushing substantially concentric with said hole.

15. A transplit rim having a valve stem hole in one end near the split, in combination with a rim end connecting member rigidly fixed on the other end of the rim and lapping beneath the end containing said hole, said member having a hook-like valve stem bushing substantially concentric with said hole and forming the driver of the rim.

In testimony whereof, I have hereunto set my hand, this 2nd day of March, 1914, in the presence of two subscribing witnesses.

ERLE K. BAKER.

Witnesses:
  N. CURTIS LAMMOND,
  JAMES S. DODGE, Jr.